US010572432B2

United States Patent
Zou et al.

(10) Patent No.: US 10,572,432 B2
(45) Date of Patent: Feb. 25, 2020

(54) MANAGING A PERIPHERAL COMPONENT INTERFACE EXPRESS DEVICE HOTPLUG

(71) Applicant: EMC Corporation, Hopkinton, MA (US)

(72) Inventors: Colin Yong Zou, Beijing (CN); Aaron Wei Wei, Qingdao (CN); Bing Hu, Shanghai (CN); Ried Ruifang Liu, Beijing (CN); Youbing Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 326 days.

(21) Appl. No.: 14/971,010

(22) Filed: Dec. 16, 2015

(65) Prior Publication Data

US 2016/0179735 A1 Jun. 23, 2016

(30) Foreign Application Priority Data

Dec. 18, 2014 (CN) .......................... 2014 1 0813970

(51) Int. Cl.
  *G06F 13/40* (2006.01)
  *G06F 13/362* (2006.01)
  *G06F 13/42* (2006.01)

(52) U.S. Cl.
  CPC ........ *G06F 13/4081* (2013.01); *G06F 13/362* (2013.01); *G06F 13/4282* (2013.01)

(58) Field of Classification Search
  CPC ............... G06F 13/362; G06F 13/4081; G06F 13/4282; G06F 13/102; G06F 13/10; G06F 3/0629; H04L 67/32; H04L 67/029
  See application file for complete search history.

(56) References Cited

U.S. PATENT DOCUMENTS

2011/0153827 A1\* 6/2011 Yengalasetti ......... G06F 9/5044
  709/226
2015/0067819 A1\* 3/2015 Shribman ............... H04L 67/06
  726/12

FOREIGN PATENT DOCUMENTS

CN 101930419 A 12/2010
CN 102023940 A 4/2011

OTHER PUBLICATIONS

Third Office Action issued in CN Application No.: 2014108139703 dated Apr. 18, 2019.

\* cited by examiner

*Primary Examiner* — Ernest Unelus
(74) *Attorney, Agent, or Firm* — Brian J. Colandreo; Mark H. Whittenberger; Holland & Knight LLP

(57) ABSTRACT

Embodiment of the present disclosure provides a system, a computer program product and a method for managing a peripheral component interface express device hotplug by receiving an operation command from a user through a user command interface module; sending, in response to reception of the operation command, the operation command to a hotplug management module via an interface provided by a hotplug interface library; and performing, by the hotplug management module, the operation command by means of at least one of an interface provided by an operating system, a kernel of the operating system, and at least one of a corresponding plurality of hotplug group service modules, in response to receiving the operation command.

14 Claims, 8 Drawing Sheets

MANAGING A PERIPHERAL COMPONENT INTERFACE EXPRESS DEVICE HOTPLUG

RELATED APPLICATION

This application claim priority from Chinese Patent Application Number CN201410813970.3, titled "SYSTEM AND METHOD FOR MANAGING HOTPLUG OF PERIPHERAL COMPONENT INTERCONNECT DEVICE" filed on Dec. 18, 2014 at the State Intellectual Property Office, China, the contents of which are herein incorporated by reference in its entirety.

TECHNICAL FIELD

Embodiments of the present disclosure relate to the field a peripheral component interface express (PCIE) device hotplug.

BACKGROUND

Presently, support for hardware device hotplug may be very popular. For example, in various electronic devices such as personal computers, most hardware may be related to supporting hotplug's. Generally, a hotplug may refer to a technology of adding or removing a hardware device (such as a PCIE card, like a network interface card (NIC), host bus adapter (HBA), etc.). Typically, a hotplug may be one of the key technologies that enhance system availability and maintainability, and a hotplug may be desirable for either a universal server or a storage device. Moreover, a maintenance service team may always expect that a device supports a function of hotplug, because it may facilitate field services and enhance total customer experience (TCE).

SUMMARY OF THE INVENTION

Embodiments of the present disclosure provide a novel technical solution for managing PCIE device hotplug. According to a embodiments of the present disclosure, there may be provided a system, a method and a computer program product for managing peripheral component interface express (PCIE) device hotplug that may include a user command interface module that may be configured to provide an interface for a user to input an operation command; a hotplug management module execute the operation command in response to an operation command from the user, by means of at least one of an interface provided by an operating system, a kernel of the operating system; and a hotplug interface library configured to provide an interface interacting with the hotplug management module.

BRIEF DESCRIPTION OF THE DRAWINGS

The above and other features of the present disclosure will become more apparent through detailed explanation on the embodiments as illustrated in the embodiments with reference to the accompanying drawings, wherein.

DETAILED DESCRIPTION

Figure 1:
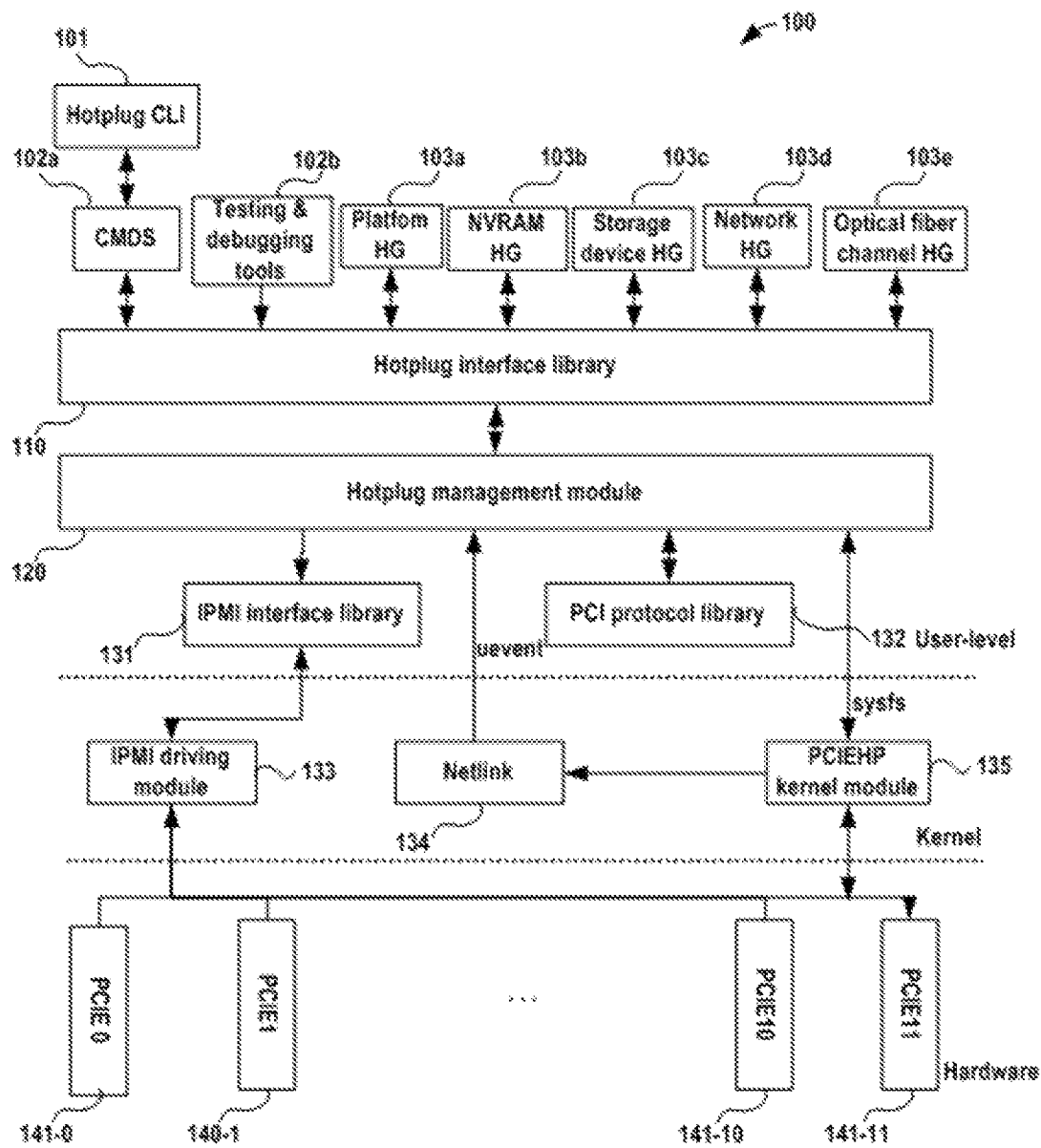
FIG. 1 schematically illustrates a block diagram of an exemplary PCIE device hotplug system framework according to one embodiment of the present disclosure.

Hereinafter, various exemplary embodiments of the present disclosure will be described with reference to the accompanying drawings. It should be noted that all of these drawings and description are only presented as exemplary preferred embodiments. It is to note that based on the subsequent description, one can easily conceive alternative embodiments of the structure and method disclosed herein, and such alternative embodiments may be used without departing from the principle of the disclosure as claimed in the present disclosure.

It would be appreciated that these exemplary embodiments are provided only for enabling those skilled in the art to better understand and then further implement the present disclosure, not intended to limit the scope of the present disclosure in any manner. Besides, in the drawings, for a purpose of illustration, optional steps, modules, and units are illustrated in dotted-line blocks.

The terms "comprise(s)," "include(s)", their derivatives and like expressions used herein should be understood to be open, i.e., "comprising/including, but not limited to." The term "based on" means "at least in part based on." The term "one embodiment" means "at least one embodiment"; and the term "another embodiment" indicates "at least one further embodiment." Relevant definitions of other terms will be provided in the description below.

In some embodiments, PCIE, as a relatively new bus and interface standard, may have been widely used in electronic devices such as a personal computer, and a PCIE device hotplug may not be a new technology in the electronics/computer industry. In some other embodiment, there already exist industrial standards defining a hierarchical architecture for hardware and PCIE bus protocol levels, however, an industrial standard method for automating configuration/un-configuration operations does not exist yet.

In some embodiment, from a perspective of hardware, currently many PCIE cards in the market may already support hotplug. In some other embodiments, a PCIE slot on a platform or firmware may also provide operating system (OS) software for powering on or off a slot. In certain embodiments, from a perspective of software, different OS systems may have different solutions, and there may be no any standard manner to help users to perform a hotplug operation. In an example embodiment, for a Linux-based system, Linux standard OS kernel may only provide a low level hotplug driver for configuring/un-configuring devices in PCIE bus protocol level, and if a user may require to configure/un-configure a device, he/she may have to seek different tools to configure/un-configure the devices based on device types. In an example embodiment, a network device of an NIC device, it may need to use an Internet protocol (IP) bundling related tool; an SAS HBA device, it may need to use a storage and multipath tool; while a fiber channel (FC) device, it may need to use a dedicated FC tool. In some embodiments, when a device is configured/un-configured, it may have to use a plurality of commands and tools. In some other embodiment, if a failure occurs during configuring/un-configuring, a user may have to manually find device usage information and may have to try for a solution.

In an example embodiment, when hot removing an NIC card, the NIC card may already be configured with an IP address or an IP bundling group, and thus may already be configured with a software protocol stack and an application supporting the NIC card. In a further embodiment, a forced removal may likely cause a software crash or may even in a serious error of the OS. In another example embodiment, if a serial attached SCSI interface (SAS) HBA card is connected for example to a disk cluster (JOBD) having a plurality of disk casings and having a volume/file system created on the disk, then it may be usually needed to check the multipath configuration in the system, first when the HBA card need to be un-configured. In a further embodiment, if there may be a path redundancy, it may be likely desired to perform a failover to another HBA path; otherwise, it may be likely desired to check out how to manually uninstall the file system and volume, and such works that may have to be done manually by an experienced system administrator, may be very troublesome and cumbersome.

In one embodiment, as far as the above problems are concerned, a challenging issue lies in that software IO protocol stacks and application programs may be usually rather complicated, and it may not be simply to find out software dependencies and then configure/un-configure a device during runtime. In another embodiment, a challenging issue lies in that there may be quite many different types of PCIE devices. In an example embodiment, a software stack for a network device may be completely different from that for those SAS HBA devices, and it may be very hard to manage the hotplug activities of all types of PCIE devices using a uniform software framework and user interface.

In one embodiment, there may be a need for an improved solution of managing device hotplug. According to one embodiment of the present disclosure, there may be provided a system for managing a peripheral component interface express (PCIE) device hotplug. In a further embodiment, the system may include a user command interface module configured to provide an interface for a user to input an operation command. In a further embodiment, the system may include a hotplug management module configured to execute the operation command in response to an operation command from the user, by means of at least one of an interface provided by an operating system, a kernel of the operating system, and a corresponding one of a plurality of hotplug group service modules. In a further embodiment, the system may include a hotplug interface library configured to provide an interface interacting with a hotplug management module.

In one embodiment, a plurality of hotplug group service modules may include a hotplug group service module corresponding to a device type. In a further embodiment, a platform hotplug group service module may be common to all device types. In a further embodiment, a hotplug group service module corresponding to a device type may be configured to provide a specific hotplug related service to a corresponding device type. In a further embodiment, a platform hotplug group service module may be configured to provide necessary basic services to all types of devices.

In another embodiment, a hotplug management module may be configured to subscribe, in response to subscription requests from a plurality of hotplug group service modules, devices of interest for them. In a further embodiment, a hotplug management module may be further configured to invoke a corresponding hotplug group service module that may be based on a type of a device to which an operation command is directed and subscriptions of a plurality of hotplug group service modules.

In a further embodiment, an operation command inputted by a user via a user command interface module may be sent to a hotplug management module by invoking a corresponding interface provided by a hotplug interface library by a user command service module.

In yet a further embodiment, a hotplug interface library may be configured to provide a first set of application interfaces that may be configurable for interaction between a user command interface module and a hotplug management module.

In a further embodiment, a hotplug interface library may be configured to provide a second set of application interfaces that may be configurable for interaction between a plurality of hotplug group service modules and a hotplug management module.

In a further embodiment, a hotplug management module may include a client management module that may be configured to manage interaction between a hotplug management module and a user command interface module. In a further embodiment a channel management module may be configured to manage interaction between a hotplug management module and a plurality of hotplug group service modules. In a further embodiment, an event management module may be configured to monitor a PCIE device hotplug-related event from a kernel of an operating system. In a further embodiment, a central control module may be configured to perform a corresponding operation by invoking, in response to a request from a client management module, the channel management module and an event management module, at least one of an interface provided by an operating system, a kernel of an operating system, and a corresponding hotplug group service module.

In yet a further embodiment, an operating system may be LINUX, wherein a hotplug management module may perform hotplug related operations to a PCIE device via an interface that may be provided by an intelligent platform management interface library in the LINUX system, an interface provided by a peripheral component interface library, a kernel invoking interface, and a kernel event.

In a further embodiment, a hotplug management module may interact with at least one of a user command interface module and a plurality of hotplug group service modules based on a socket interface. In a further embodiment, an operation command may include one or more of: a show command, a power-on command, a power-off command, a configuration command, and an un-configuration command.

In yet a further embodiment, a PCIE device hotplug may include states of: empty state, indicating that no card may be inserted in a slot; unpowered state, indicating that a card may be inserted into a slot but has not been powered yet; powered state, indicating that a card inserted in a slot may be powered but may not have been configured yet; configured state, indicating that a card in a slot has been configured; and maintenance state, indicating a failure of a configuration operation or un-configuration operation on a card that may be inserted in a slot, wherein the state may be changed to a configured state or a powered state after retrying of a configuration operation or un-configuration operation succeeds.

A further embodiment discloses a method for managing peripheral component interface express (PCIE) device hotplug. A further embodiment may include receiving an operation command from a user through a user command interface module. A further embodiment may include sending an operation command to a hotplug management module via an interface provided by a hotplug interface library, in response to reception of an operation command. A further embodiment may include performing, in response to reception of a sent operation command, an operation command by a hotplug management module by means of at least one of an interface provided by an operating system, a kernel of an operating system, and a corresponding one of a plurality of hotplug group service modules.

In a further embodiment, there may be provided a computer program product including a program code embodied thereon, which, when executed on a processor, causes the processor to perform the method according to a second aspect of the present disclosure. In embodiments of the present disclosure, there may be provided a new architecture for PCIE device hotplug. In a further embodiment, the architecture may achieve automation of a PCIE device hotplug operation, i.e., providing a uniform user interface for various types of PCIE devices so as to automatically perform a configuration operation when a new device may be newly added or perform an un-configuration operation before a device may be removed. According to embodiments of the present disclosure, user operation may be simplified substantially, and operation efficiency may be significantly enhanced, and user experience may be substantially improved.

Hereinafter, a solution of managing PCIE device hotplug according to an embodiment of the present disclosure will be described in detail through embodiments with reference to the drawings. First, reference is made to FIG. 1, to describe an exemplary device hotplug system framework according to one embodiment of the present disclosure.

As shown in FIG. 1, the framework is divided into a user level, a kernel level, and a hardware level. At a user level, a user application and/or module is run/executed. As shown in FIG. 1, hotplug command line interface (CLI) module 101 is an interface provided to the user such that the user issues an operation command through entering a command line. The hotplug CLI module sends the received command to command service module CMDS 102a. Upon receiving the hotplug operation command, command service module CMDS 102a will send the operation command to hotplug management module 120 via an application programming interface (API) provided by hotplug interface library 110. In one embodiment, it should be noted that although what is shown here is a hotplug CLI module and a CMDS module, the hotplug CLI module per se may also have a functionality of invoking the API of the hotplug interface library, which means that the CMDS may be integrated into the hotplug CLI module, and they may not necessarily be two separate modules. Besides, during architecture design, testing & debugging tool 102b may be used as a user command interface module for the user to enter an operation command Referring to FIG. 1, an operation command from testing & debugging tool 102b may also be sent to hotplug management module 120 via the application programming interface (API) provided by hotplug interface library 110.

Besides, at the user level, there may be further included a plurality of hotplug group (HG) service modules, e.g., platform HG service module 103a, non-volatile random access memory (NVRAM) HG service module 103b, storage device HG service module 103c, network HG service module 103d, and fiber channel (FC) service module 103e. In the hotplug service architecture according to the present disclosure, PCIE devices are divided into several groups by types of the PCIE devices, e.g., NVRAM HG, storage device HG, network HG, and FC HG; and each of HGs has a corresponding service module set therefor and each service module provides a specific hotplug related service for a corresponding type of device. In some embodiment, a platform HG may be specifically set, which may be a common service module for all types of PCIE devices and provides basic services required for all types of the PCIE devices, e.g., PCIE device drive program, PCIE protocol stack, PCI protocol layer abnormality detection, etc. Referring to FIG. 1, these HG service modules 103a-103e communicate with hotplug management module 120 through hotplug interface library 110. Therefore, each service module includes a daemon for invoking an API provided by hotplug interface library 110 so as to communicate with hotplug management module 120.

In an embodiment of the present disclosure, hotplug interface library 110 is configured to provide application programming interfaces (API) for peripheral modules such as respective HG service modules and command input interface modules to communicate with hotplug management module 120. These peripheral modules may interact with hotplug management module 120 via these APIs.

In particular, hotplug interface library 110 may provide two sets of APIs. The first set of APIs are configured to interact between a peripheral module for receiving a user command (such as hotplug CLI module 101) and hotplug management module 120. Through the first set of API, hotplug CLI module 101, may invoke a corresponding service through the hotplug management module 120 to notify the operation command entered by a user to hotplug management module 120, such that hotplug management module 120 notifies a result of or response to the execution of the operation command to the CLI module. The second set of APIs is mainly provided for respective HG service modules, such that they can perform interaction with hotplug management module 120. For example, respective HG service modules may subscribe a device type of its interest with hotplug management module 120 through a corresponding API in the set of APIs, and hotplug management module 120 may issue a corresponding notification to respective HG service modules through corresponding APIs in the set of APIs. In this way, when a hotplug event/execution of a command operation occurs on a device which one HG service module is in charge of or is interested in, hotplug management module 120 may invoke the HG service module through the set of interfaces to perform a corresponding operation.

Particularly, for a second set of APIs, the HG service module may provide a group of callback functions during execution of library initialization. When a corresponding event/request occurs, hotplug management module 120 commands a corresponding HG service module to perform a corresponding action using these callback functions. The callback functions may be designed in an asynchronous manner so as to avoid invading the existing HG code. This means all callback functions provided by hotplug interface library 110 will be invoked in a dedicated thread, rather than a main thread. Therefore, the HG service modules need to take care of concurrent operations where necessary. After the HG service modules complete their corresponding work of hot adding or hot removal, they will also send corresponding responses through the second set of APIs.

Hotplug management module 120 is a core of the hotplug system architecture, which is responsible for handling PCIE device hotplug-related operation requests from respective modules. Hereinafter, hotplug management module 120 will be described in detail with reference to FIG. 2, which is thus not detailed here.

Besides, at the user layer, interfaces in two libraries may also be invoked. The two libraries are intelligent platform management interface (IPMI) library (i.e., "libipmi") 131 and PCI protocol library 132 (i.e., "libpci"), which are libraries provided by the LINUX operating system per se. The two libraries provide, for hotplug management module 120, interfaces for performing operations on hardware devices and interfaces for invoking the services provided by the kernel of the operating system. For example, powering on/off the PCIE device may be implemented through IPMI library 131, while operations such as scanning PCI type devices may be implemented using PCI protocol library 132.

In this architecture, IPMI drive module 133 is at the kernel level. IPMI drive module 133 is a program for performing communication with a PCIE device at a bottom layer. Only via the drive module can an upper layer module perform various operations on the PCIE device. The API provided by IMPI interface library 131 may invoke a service provided by IPMI drive program 133 to further perform operations such as power on or power off to the PCIE devices.

Besides, there is also Netlink module 134 and PCIE hotplug (PCIEHP) kernel module 135. Netlink module 134 is an event interface for a kernel event Uevent in the LINUX system. Through the kernel event Uevent, an event or message from the kernel may be provided to an upper layer module. For example, some result information or response of kernel-level operations may be fed back to the hotplug management module in a form of kernel event Uevent via event interface Netlink module 134.

Besides, hotplug management module 120 performs a corresponding operation on a kernel invoking the operating system through a kernel invoking interface such as a sysfs file system, wherein the file system sysfs is a virtual file system, which facilitates management of system devices. However, it should be noted that PCIEHP kernel module 135 may be invoked through a kernel system invoking interface, instead of sysfs. PCIEHP kernel module 135 may send the sysfs to hotplug management module 120 and then present the information contained therein to a user through a hotplug interface library and the CMDS service module. For example, a sysfs file modified by a user may be sent to PCIEHP kernel module 135 through hotplug management module 120. When receiving the sysfs file from the user, PCIEHP kernel module 135 will perform a corresponding operation based on the information contained therein. PCIEHP kernel module 135 is a standard module provided by the LINUX system and in the embodiments of the present disclosure, it is mainly used for obtaining PCIE device related information and performing hotplug related operations at the PCIE protocol layer. For example, the hotplug component information of hardware may be obtained through checking a slot performance register in a PCIE performance data structure. These registers may reflect the type of a PCIE device, whether the slot supports hotplug, whether the device supports a sudden plug-out operation without notifying the software. It may also learn whether there are hardware elements such as an alarming light and a controller. When hotplug management module 120 is invoked, PCIEHP kernel module 135 may also perform PCIE configuration/un-configuration operations, such as load/unload of a device drive program, PCI bus scanning, PCI resource assignment/un-assignment, etc.

At the hardware layer there are a plurality of PCIE slots, such as PCIE 0-PCIE 11, 141-1-141-11. In these PCIE slots, various types of PCIE devices may be inserted, such as a storage device, a network device, a memory device, a fiber channel connection card, etc. However, in some applications, for at least some of these slots, the device types that can be inserted are likely to be limited.

Figure 2:
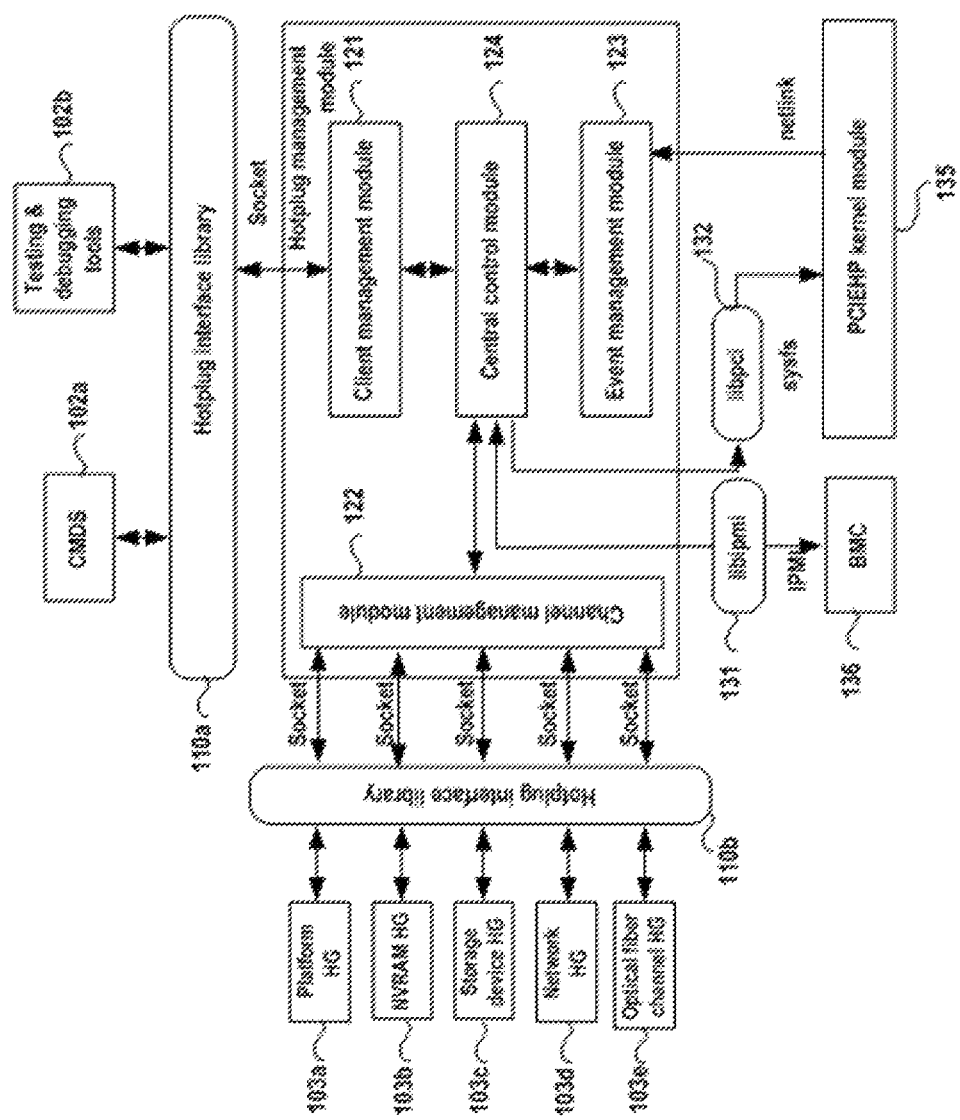
FIG. 2 schematically illustrates a block diagram of an exemplary hotplug managing system according to one embodiment of the present disclosure.

Next, some details of respective modules, particularly those at the user level in the above architecture, will be introduced. Reference is made to FIG. 2 which illustrates block diagram of an exemplary hotplug managing system according to one embodiment of the present disclosure.

In one embodiment according to the present disclosure, hotplug management module 120 may be designed as a single-thread event driving module. Module 120 will listen to events of respective components in the system. These events, for example, may include: a user command input from, e.g., CMDS or any debugging & testing tool; register and deregister requests from respectively HG service modules and hotplug operation requests and responses; and kernel event messages from a kernel space. Driven by these events, hotplug management module 120 will perform corresponding actions.

Specifically, as shown in FIG. 2, hotplug management module 120 comprises client management module 121, channel management module 122, an event management module 123, and central control module 124. Client management module 121 is responsible for managing interaction between hotplug management module 120 and user command interface module 120a, and testing & debugging tool 102b. For example, client management module 121 may be responsible for receiving various operation commands or requests from a user and returning corresponding responses or results to the user. Channel management module 122 is for managing interaction between hotplug management module 120 and a plurality of hotplug group service modules. For example, channel management module 122 is responsible for subscription or registration of HG service modules, operation responses from the HG service modules, various notifications for the HG service modules, and checking the healthy condition of the channel Event management module 123 listens to PCIE device hotplug related events from the kernel of the operating system. Specifically, module 123 listens to the PCIE device hotplug-related kernel events from PCIEHP kernel module 135 at the netlink interface, so as to receive information, operation results or responses from the kernel. Because event management module 122 may be used for listening to netlink messages from a kernel space, hotplug management module 120 may obtain some information related to the PCIE device from the kernel level. Central control module 124 is responsible for invoking at least one of an interface provided by the operating system, kernel of the operating system, and corresponding hotplug group service module, in response to requests from client management module 121, channel management module 122, or event management module 123, so as to perform corresponding operations, for example, processing an operation command from a user, subscription/registration requests from respective HG service modules, requests for cancelling subscription/registration, operation responses, and event information from a kernel, and the like.

Next, interaction between hotplug management module 120 and other modules or components will be described in detail. CMDS 102a or other modules such as testing & debugging tool 102b use the APIs (the first set of APIs) provided by hotplug interface library 110a to send operation commands to hotplug management module 120. Client management module 121 in hotplug management module 120 will receive the command or operation requests, and then invoke a service provided by central control module 124 to process the request. Hotplug management module 120, particularly client management module 121, will also return an operation result or response to CMDS 102a or other modules such as testing & debugging tool 102b through the corresponding APIs provided by hotplug interface 102a.

Respective HG service modules 103a-103e also use the APIs (the second group of interfaces) provided by hotplug interface library 110b to subscribe a hotplug event of a device type of its interest or registers with hotplug management module 120. Channel service module 122 is responsible for managing subscription and notification of the HG service module and meanwhile responsible for channel healthy condition management. Usually, once a channel between hotplug management module 120 and the HG service module is established, the channel will be used for sending a hotplug request, response, notification, etc.

Event management module 122 listens to netlink messages from the kernel space; therefore, hotplug management module 120 may know whether the kernel, for example, has successfully initialized or de-initialized the PCIE layer.

Hotplug management module 120 will manage the PCIE device by means of the functionality provided by the underlying operating system. An operating system kernel such as LINUX kernel usually supports PCIE hotplug pursuant to PCIE standard specifications. Therefore, some functional components in the operating system may be used to support PCIE hotplug. For the LINUX system, these functions include, but not limited to:

in the case of hot adding, configure the PCIE device.
    rescanning the PCIE bus to find a new device. If a hot added card includes a plurality of devices and bridges, the hotplug module of the Linux will list all devices and bridges.
    assigning PCI resources to the new device, including assigning an MEM/IO address, bus number, device number, and function number (BDF), etc.
    loading a corresponding device driver; and
    in the case of hot removal, un-configure the PCI device.
    detaching the device driver.
    canceling assignment of PCI resources.

In some embodiment, a DDOS hotplug framework may interact with a Linux kernel hotplug module through a sysfs kernel invoking interface. In a further embodiment, when a CONFIG_HOTPLUG_PCI_PCIE configuration in the Linux operating system kernel may be enabled, two attributes of a PCIE device may be provided through sysfs, i.e., /sys/bus/pci/devices<bdf>/rescan and /sys/bus/pci/device/<bdf>/remove. In a further embodiment, PCIE rescan/removal procedures may be triggered, respectively, by writing a character (any character) in the sysfs.

Specifically, in an embodiment according to the present disclosure, hotplug management module 120 may manage the PCIE devices based on two libraries provided by an underlying operating system. In one embodiment, one is a libipmi library that may provide APIs for performing operations on PCIE devices, such as powering on, powering off, state checking, setting LED, and the like. In a further embodiment, the other is a libpci library that may provide an API for performing PCIE protocol layer-related hotplug operations. In a further embodiment, a PCIE related operations may include, for example, scanning a PCIE device, accessing a PCIE register, etc. In a further embodiment, hotplug management module 120 performs PCIE configuration/un-configuration operations in a kernel by means of sysfs, including loading/unloading a driver of a corresponding type of PCIE device, PCI bus scan, PCI resource assignment/de-assignment, etc.

Referring back to FIG. 2, communication of hotplug management module 120 with HG service modules 103a-103e, user command input interface module 102a, and testing & debugging tool 102b may use any type of inter-process communication (IPC) mechanism, but preferably uses a socket interface. This may implement it as a single thread and event-driven model, and a response time, for example, may be MAX (D1, D2, D3 . . . DN). Through use of a socket interface, hotplug management module 120 may act as a central server, while peripheral modules such as the HG service module, user command interface module 102a, and testing & debugging tool 102b may act as a client, thereby simplifying the model. However, this needs to consider information encoding and decoding and handle timeout appropriately. Moreover, hotplug management module 120 needs to process netlink sockets. Through use of sockets, an I/O multiplexing method (selection, poll, enhanced poll) may be adopted, thereby implementing the system in a uniform manner.

As mentioned above, hotplug interface libraries 110a and 110b provide at least two groups of APIs for communicating with the hotplug management module. The hotplug interface libraries hide details of the underlying processing (socket-related operations). Because the underlying processing is transparent to users, a user using the APIs may focus more on business logic. In embodiments of the present disclosure, a plurality of commands/operations may be provided to a user. In an example embodiment, these operations include but may not be limited to a show operation, a power-on operation, a power-off operation, a configuration operation, and an un-configuration operation. In a further embodiment, each of these operations may likely causes change of PCIE device state which may be visible to a user. Therefore, before describing these operation commands in detail, a state machine that may be applicable in the embodiments of the present disclosure will be described first.

Figure 3:
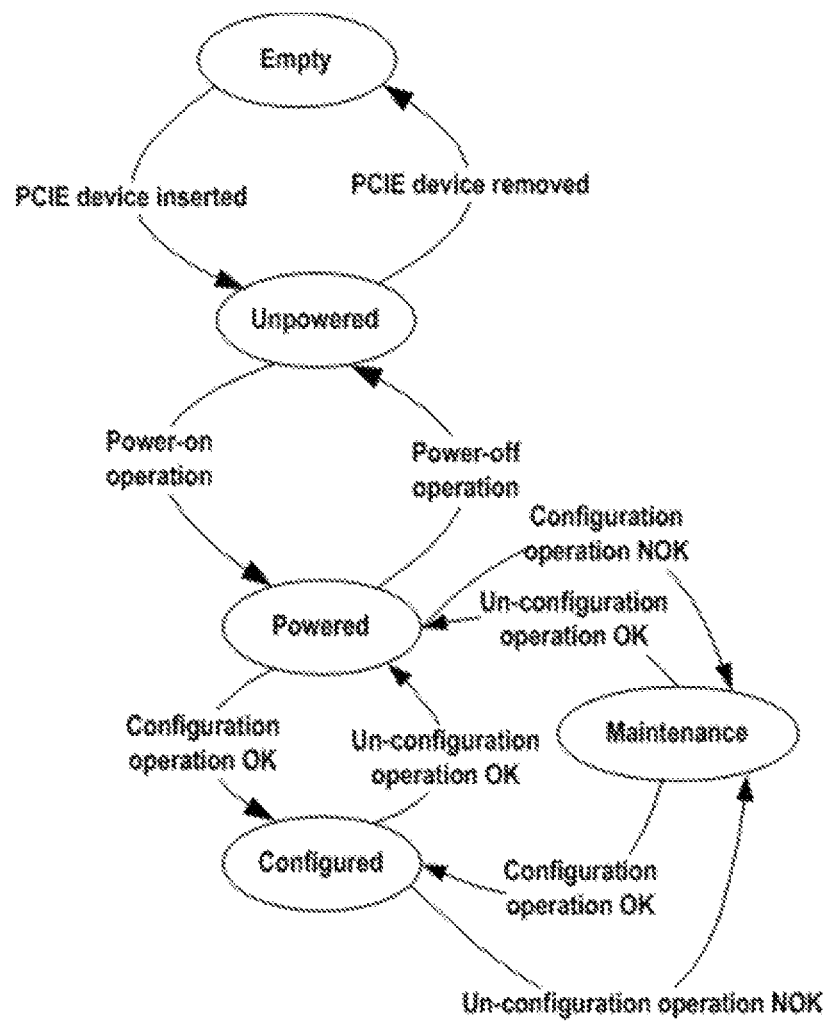
FIG. 3 schematically illustrates a diagram of an exemplary state machine according to one embodiment of the present disclosure.

FIG. 3 shows an exemplary state machine according to one embodiment of the present disclosure. As shown in FIG. 3, for a PCIE hot-plug operation, states involved may include totally five states, i.e., "empty," "powered," "unpowered," "configured," and "maintenance."

When there is no PCIE device in a PCIE slot, the state is "empty," indicating that no card has been inserted in the slot. If the user inserts a PCIE card into the slot (X01), then the state is appropriately changed from "empty" to "unpowered," indicating that a card is inserted in the slot but has not been powered yet. If the user removes the PCIE device from the slot in the "unpowered" state, then the stare returns from "unpowered" to "empty". Alternatively, if the power-on operation is executed, then the state enters into "powered" from "unpowered," indicating that the card in the slot has been powered, but has not been configured yet. If a power-off operation is performed in the "powered state," then the state returns from "powered" to "unpowered." On the contrary, if a configuration operation is performed, then in case of a successful configuration operation, the state directly enters into "configured" from "powered," indicating that the card in the slot has been configured. However, if the configuration operation fails or partially succeeds (e.g., the configuration operation is performed successfully only in a part of the HG service modules which the PCIE device type is interested in), the state will enter into the "maintenance" state. In the "configured" state, if un-configuration is performed, in case of a successful un-configuration, the state will directly return to "powered" from "configured." In case of a failing un-configuration, the state machine will be temporarily in a "maintenance" state. Besides, the "maintenance" state is defined to alarm a user that the operation has not been fully successful, i.e., indicating that the configuration or un-configuration operation on the card in the slot fails. In this state, the user may re-try the operation. In case of retrying the configuration operation, the state will be changed from "maintenance" to "configured state." However, after the un-configuration operation that is re-initiated by the user succeeds, the state returns from "maintenance" to "powered." Alternatively, it should be noted that if the device is always in the "maintenance" state after experiencing a plurality of re-operation attempts, it is indicated that manual intervening might be needed.

It should be noted that according to the above state machine, more or less states may be included. For example, in the maintenance state, more states may be designed based on failure types of various devices. However, state machine as shown in FIG. 3 provides a good tradeoff between a user interface experience and demands of hotplug operations.

Next, operations commends provided to a user according to an embodiment of the present disclosure will be described below.

Show Operation

The show operation is an operation for obtaining the current state of the PCIE device and its usage information. In the embodiments of the present disclosure, this operation may be implemented through a "show" command. In a further embodiment, before a user runs another hotplug command to change a state of a PCIE device, hotplug management module 120 may be required to provide PCIE device related information through a list command. In a further embodiment, such information may be very advantageous for user operation, e.g., it may help a user to evaluate an impact from removing a specific PCIE device.

For the show operation, a user for example may enter a corresponding command line (such as "show status<slot>") in a user command input interface module such as hotplug CLI module 101. A command inputted by a user will be provided to CMDS module 102a. Upon receiving the command, CMDS module 102a will invoke a corresponding API in hotplug interface library 110 so as to obtain the information of the PCIE device. Upon receiving the show command, hotplug management module 120 retrieves the state of the PCIE device (e.g., in the "empty" state or the "configured" state) from the IPMI interface library. If PCIE device is powered on and configured, it indicates that PCIE device is now functional and has been loaded with a corresponding drive module and provided with an entrance for the sysfs file system. At this point, hotplug management module 120 will check the device type of PCIE device and obtain usage information of PCIE device from a corresponding HG service module through an already established corresponding channel. For example, for a NIC card, it will query network HG service module 103d, while for the SAS HBA, it will query storage device HG service module 103c.

In some embodiments, respective HG service modules generally may collect usage information of a PCIE device of a corresponding type, e.g., disk information, multipath information, drive module information, and state information of a PCIE device (has been fully configured or partially configured), etc. In a further embodiment, these HG service modules may obtain usage information of PCIE devices and send it to hotplug management module 120 through the API. After receiving information of PCIE devices, hotplug management module 120 provides the information to CMDS 102a through the API provided by hotplug interface library 110. CMDS 102a then provides the information to the user.

Hereinafter, for the sake of illustration, Table 1 provides an example of a CLI interface after entering the show command

TABLE 1

Show Command Interface
Command: show status [slot]
Result:

| Slot | state | Vendor | Device | usage |
|---|---|---|---|---|
| 1 | configured | EMC | Quad Port 6 Gbps SAS | Multipath xx, Shelf −1 xxxx |
| 2 | (empty) | | | |
| 3 | powered | EMC | Quad Port 10GBase-T | |
| 4 | unpowered | EMC | NVRAM 4 GB Model 2 | |

As shown in Table 1, "Command" section shows the show command input by a user, while in the "Result" section, results of executing the show command are shown. In the information shown in Table 1, states of devices in various slots may be included, device manufacturers may be included, device names may be included, device usage information may be included, etc. It should be noted that the results displayed may include more or less information, and not only limited to the examples as shown in Table 1.

Hot Adding Operation

In an embodiment of the present disclosure, PCIE hot adding operation may be performed through two operations: "power-on" operation, and "configuration" operation. If a user directly inputs a hotplug configuration command without first powering on PCIE device, then hotplug management module 120 will first power on PCIE device and then perform configuration on it.

Power-On Operation

When finding that a user issues a configuration command but PCIE device has not been powered yet, hotplug management module 120 will invoke the IPMI interface library so as to power on the corresponding PCIE device. The IPMI interface library will power on PCIE device using the IPMI OEM command. A corresponding HG service module notices the power-on process, and then returns a power-on response through an established channel. The CMDS module presents power-on information to the user after receiving the power-on response.

In Table 2 below, an example CLI interface of the power-on command is provided for illustration purposes.

TABLE 2

Power-On Command Interface

Command:
    poweron <slot>
Result:
    slot <#> power on : OK
    slot <#> power on : Failed, (already powered on | not present | unable to powered on due to hardware issue)

Table 2 shows a power-on command in the "Command" section. In the "Result" section, results of executing the power-on command are shown. As shown in Table 2, in an embodiment according to the present disclosure, in the case of power-on failure, detailed information may be provided.

Besides, a user may separately issue a power-on command such as "poweron<slot>" so as to power on the corresponding PCIE device. After hotplug management module 120 receives the power-on command from a user through CMDS module 102a, it will invoke the IPMI interface library so as to power on a corresponding PCIE device.

Configuration Operation

After PCIE device is in a "powered" state. Next, the configuration operation may be performed to accomplish the hot adding operation. Particularly, a user may issue a configuration command such as "configure <slot>" so as to start the configuration process. Hotplug management module 120 receives the configuration command and checks the state of PCIE device. If PCIE device is in the "powered" or "maintenance" state, subsequent steps will be performed; otherwise, PCIE device is first powered on, and then goes into the subsequent steps. Hotplug management module 120 will request the Linux kernel to perform PCIE rescan so as to perform PCIE layer configuration and load the device driver.

After the kernel finishes the configuration and driver loading at the PCIE layer, network link information will be broadcasted to processes interested in NETLINK_KOBJECT_UEVENT. Hotplug management module 120, in particular event management module 123, listens to and filters the network link information, and guarantees reception of a message related to PCIE device. Therefore, hotplug management module 120 may learn that the kernel has successfully completed the configuration at the PCIE layer. After the configuration is successfully performed at the PCIE layer, hotplug management module 120 may read the information on PCIE device from a corresponding register by means of the PCI protocol library. In this way, the type of PCIE device may be ascertained. Then, the hotplug management module 120 will send a configuration request to a HG service module that serves PCIE device of the type or that is interested therein. The requested HG service module responds to the request and starts configuring PCIE device. For example, it may assign resources to PCIE device, adjusts an internal table, and configures a complete stack for the device. After the HG service module completes configuration of PCIE device, it will send a corresponding response to hotplug management module 120. Hotplug management module 120 sends the response to the CMDS through the API provided by hotplug interface library 110 and then notifies the user of completion of the adding via the CMDS.

In the Table 3 below, an exemplary CLI interface of a configuration command is provided for illustration purposes.

TABLE 3

Configuration Command Interface

Command:
    configure <slot>
    (may show some progress bar, or this operation may take several minutes, be patient)
    If it is applied to a slot in "unpowered" state, then it automatically power on the slot and then configure the device.
Result:
    slot <#> configure : OK
    slot <#> configure : Failed, (already configured | not present | not powered | configure failed, FC error/SAS HBA return...)

Table 3 shows the configuration command in the "Command" section. The "Result" section shows the results of executing the configuration command. As shown in Table 3, in the embodiment of the present disclosure, in case of a configuration failure, detailed information may be provided.

Hot Removal Operation

In one embodiment of the present disclosure, a hot removal operation of PCIE device may be performed through an un-configuration command and a power-off command.

The user for example may first perform a hot removal process by releasing an un-configuration command such as "un-configure." Hotplug management module 120 performs the un-configuration operation on PCIE device. For illustration purposes, an example of the un-configuration operation is provided in the description as below.

Un-Configuration Command:

A user first issues an un-configuration command such as "un-configure<slot>" to start the hot removal process. Hotplug management module 120 receives the un-configuration command and then checks the state of PCIE device. Only when PCIE device is in a "configured" or "maintenance" state, the subsequent operations will be executed; otherwise, the requirement will be rejected through an "invalid state" response. If PCIE device is in a "configured" or "maintenance" state, then hotplug management module 120 will send the un-configuration request to the HG service module serving PCIE device. The HG service module receives the un-configuration request and starts un-configuring PCIE device. The HG service module will release the resources of PCIE device, adjust the internal table, and tear down all software stacks on the corresponding device. After successfully un-configuring PCIE device, the HG service module sends a response to hotplug management module 120 to notify that PCIE device has been successfully un-configured. Hotplug management module 120 then starts removing the device from the OS layer. The hotplug management module will request the Linux kernel to perform removal of the PCIE layer so as to release the resources at the PCIE layer. Then, the kernel will remove the PCIE tree and detach the driver for the PCIE device.

After the kernel finishes the PCIE removal, the network link information will be broadcast to the process interested in NETLINK_KOBJECT_UEVENT. Hotplug management module 120, particularly event management module 123, listens to and filters the network link information to guarantee reception of a message related to PCIE device. After receiving an acknowledgement of successful deletion of PCIE device from the kernel, hotplug management module 120 will send a response to CMDS 102a so as to notify the user that the requested un-configuration operation has been successfully executed.

TABLE 4

Un-configuration command Interface

Command:
    unconfigure <slot>    (two/three steps : 1. precheck  2. do 3. commit)
    (should display some warning messages and ask user to confirm removal. Like, remove this PCIE will cause xxxx, do you really want to proceed? (N/y))
    (may show some progress bar, or this operation may take several minutes, be patient)
Result:
    slot <#> unconfig: OK
    slot <#> unconfig: Failed, (not configured | not present | not powered | dependency detected, FC error/SAS HBA return .... | I/O HG is not available | I/O HG error)

As shown in Table 4, the "command" section shows an un-configuration command. The "Result" section shows results of executing the un-configuration command. Moreover, in the embodiment of the present disclosure, detailed information may be provided in the case of un-configuration failure.

Power-Off Command:

If the user directly issues a power-off command without first un-configuring PCIE device, hotplug management module 120 will first un-configure PCIE device and then perform a power-off operation. Hereinafter, an example of a power-off operation will be described.

The user issues a power-off command such as "poweroff<slot>" through the user command interface module to command power-off of PCIE device. After receiving the power-off command, hotplug management module 120 will check whether the PCIE device is in a "configured" state. If so, the "un-configure" operation is performed as above mentioned; after the un-configuration operation is completed, PCIE device will turn into the "un-configured" state. If PCIE device is in the "un-configured" state, hotplug management module 120 may invoke the IPMI interface library provided by the bottom-layer operating system. The IPMI interface library will power off PCIE device using an IPMI OEM command. The HG service module observes the power-off operation and then returns a power-off response to notify that PCIE device has been successfully powered off.

TABLE 5

Power-Off command Interface

Command:
    poweroff <slot>
    If it is applied to a slot in "configed" state, then it automatically unconfigures the device and then power off the slot.
Result:
    slot <#> power off : OK
    slot <#> power off : Failed, (already powered off | not present | unable to powered off due to hardware issue)

As shown in Table 5, in the "Command" section, a power off command is shown. In the "Result" section, results of executing the power-off command are shown. As shown in Table 5, in the embodiments of the present disclosure, in the case of power-off failure, detailed information may be provided.

Next, for illustration purposes, description will be made to an operation of hotplug management module 120 when an initialization operation is performed.

In the embodiments of the present disclosure, hotplug management module 120, for example, may be initiated by the initialization component "ini" when a DDR boots. Afterwards, the initialization component "ini" will start initializing its resources and start services.

First, hotplug management module 120 will be initialized and started. This initialization operation specifically comprises initializing IPMI library "libipmi" and retrieving PCIE device information from the "libipmi." Then, the PCI protocol library is initialized, and the BDF of each PCIE device is found. Each PCIE device may comprise a plurality of endpoints, which means for a PCIE device, a set of BDFs need to be maintained. This, for example, may be implemented by obtaining all leaf nodes through scanning the PCI tree of PCIE device. "Libpci" provides an API for obtaining a bus range of a slot number. Scanning will be performed within a bus range corresponding to that slot number. Next, the netlink management module is initialized. The objective of this operation is to open a connection socket so as to monitor the UEVENT. Then, the initialization is started, and the channel management module is started. This involves: starting a socket server at a known address (preferably UNIX HG socket); then waiting for registration messages from the HG. After the entire initialization process is completed, it may wait for a user command from any user in the CMDS or other process.

Next, only for the purpose of illustration, the registration or subscription operations of the HG service module will be described in detail.

In the embodiments of the present disclosure, each PCIE type belongs to a particular HG service module (it might contain a plurality of modules) and is served thereby. For example, for an SAS HBA card, its owner should be a storage HG service module. If a user desires deleting an SAS HBA, the storage HG service module should perform specific operations including, but not limited to: releasing a resource, closing a corresponding file, and tear down the software stack on top of the device. If the HG service module comprises a plurality of daemons, then some of them may coordinate these operations.

For the PCIE hot adding/removal, the hotplug management module will invoke a corresponding HG service module to perform a particular work at an appropriate time point so as to perform a particular work so as to complete the entire request. In order achieve this objective, the hotplug management module will maintain channels to the HG service module. These channels are established after the registration operation, and then maintained by the channel service module.

Besides, when an HG observes that a certain type of PCIE device is deleted or added, it will issue a notification and registers itself to hotplug management module 120 through an API provided by hotplug interface 110, or subscribes this type of device with hotplug management module 120. Alternatively, this type of device is subscribed when the management service system is initiated.

During this registration process, an HG will proclaim which type of HG it belongs to. Then, the hotplug management module may associate these types of PCIE devices with corresponding channels. Each channel will be identified through a uniquely determined keyword. This keyword, for example, may be a character string. In this way, it will facilitate the hotplug management module to maintain the state of respective channels.

Among these HG service modules, most HG service modules are determined based on the device type, but there is also a common type service module, i.e., a platform service module, which may be used by any procedure or process concerning PCIE changes in the system. At any time, when the PCIE device is deleted, the HG service module whose type of PCIE device are subscribed will be the last module that is notified; while when the PCIE device is added, it will be the first module that is notified.

Actually, any HG service module or process may register itself with the hotplug management module; thus, at the start of the hotplug operation, if the type of PCIE device matches the type of the registration, then the corresponding HG will be notified. This is in fact a sub-notification module and the difference lies in that sometimes, the HG service module not only needs to receive the notification, but also needs to perform actions and return a notification when being invoked.

Hereinafter, for the purpose of illustration, the SAS HBA PCIE device will be taken as an example to describe a signal flow when a PCIE device is hot added or hot removed, or its state is shown. In the example below, the HG X service module and the storage device HG service module are both interested in PCIE device of a storage type and thus registers with a hotplug management module. Therefore, both of them may be notified when the SAS HBA is hot added or hot removed, and its state is shown.

Figure 4:
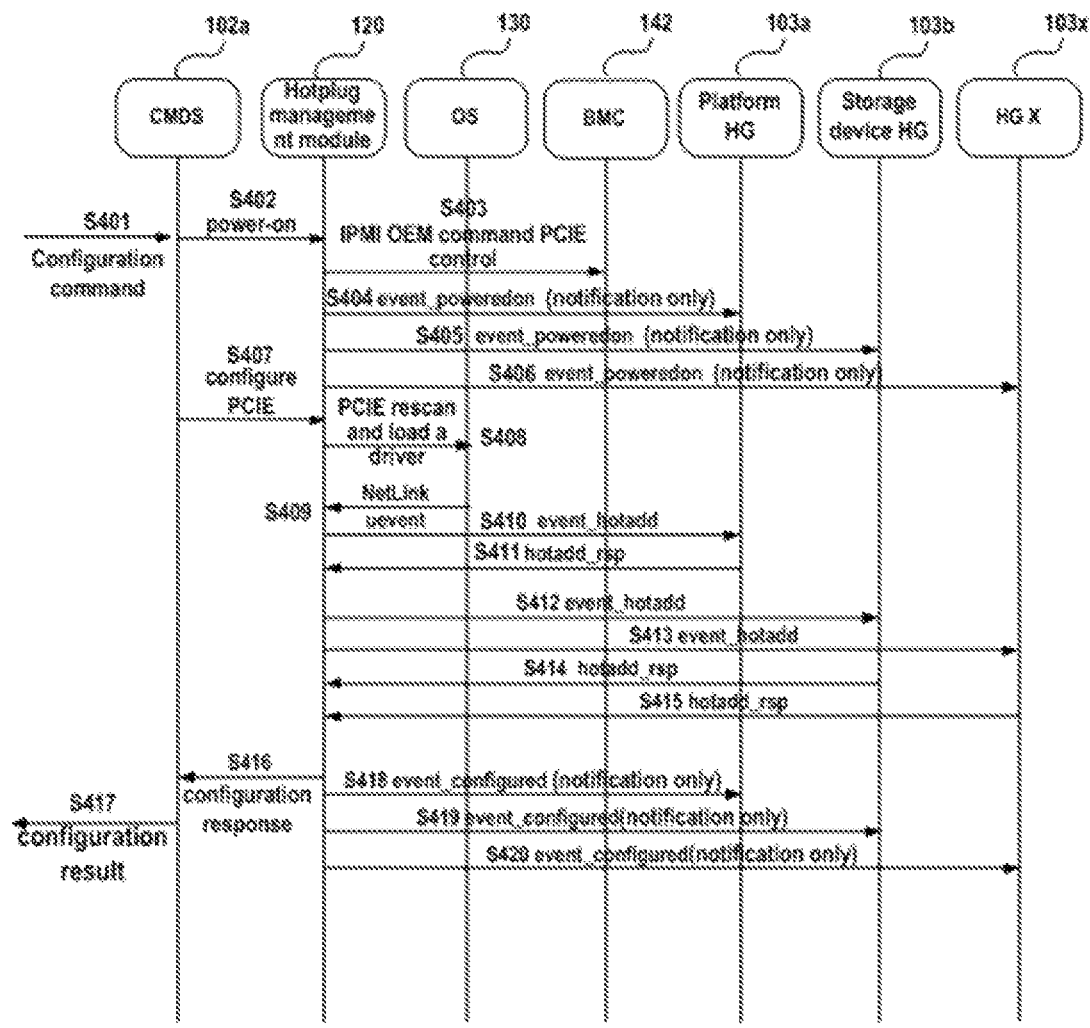
FIG. 4 schematically illustrates a signal flow diagram of an exemplary hot adding operation according to one embodiment of the present disclosure.

First, as shown in FIG. 4. in step S401, CMDS module 102a receives a configuration command from hotplug CLI module 101. After receiving the configuration command, CMDS module 102a first sends a power-on command "poweron" to hotplug management module 120 in step S402. After receiving the request, hotplug management module 120 invokes the IPMI OEM command through an IPMI interface to request a baseboard management controller (BMC) to perform a power-on operation on the PCIE device. At the same time, in step S404, step S405, and step S406, the power-on event "event_poweredon" message is sent to platform hotplug group service module 103a, storage device HG service module 103b, and HG X service module 103x, respectively. After the power-on operation is completed, CMDS module 102a sends the PCIE configuration command "config_pcie" to hotplug management module 120. Hotplug management module 120 notifies the operating system to perform PCIE rescan and load the device driver. After the operating system completes the operation, in step S409, the "unevent" is returned to hotplug management module 120 as an operation response through the netlink interface. Afterwards, hotplug management module 120 sends the hotplug event message "event_hotadd" to PCI service module 103a, storage device HG service module 103b, the HG X service module 103x in steps S410, S412, and S413, to notify them of the hot adding event. PCI service module 103a, storage device HG service module 103b, the HG X service module 103x performs hotplug related operations after receiving the "event_hotadd" message, respectively, and returns corresponding operation responses to hotplug management module 120 in steps S411, S414, and S415, respectively. Afterwards, the hotplug management module returns a configuration response to CMDS module 102a in step S416 to notify the completion of the configuration. In the meanwhile, in steps S418-S420, the configured event notification message "event_configured" is sent to PCI service module 103a, storage device HG service module 103b, and HG X service module 103x to notify them the configuration has been completed. After receiving a configuration response, the CMDS returns the configuration result to the user.

Figure 5:
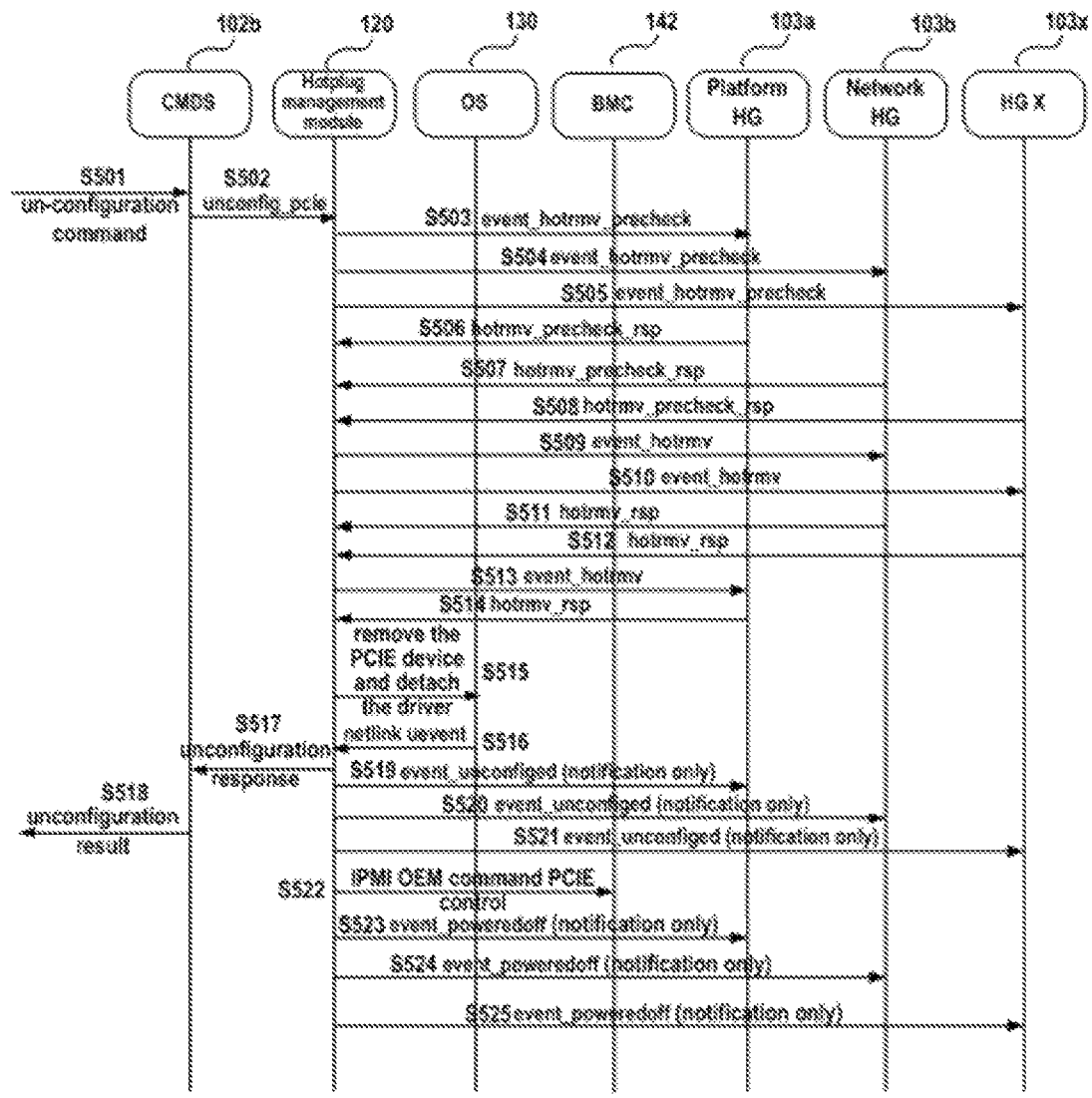
FIG. 5 schematically illustrates a signal flow diagram of an exemplary hot removal operation according to one embodiment of the present disclosure.
Figure 6:
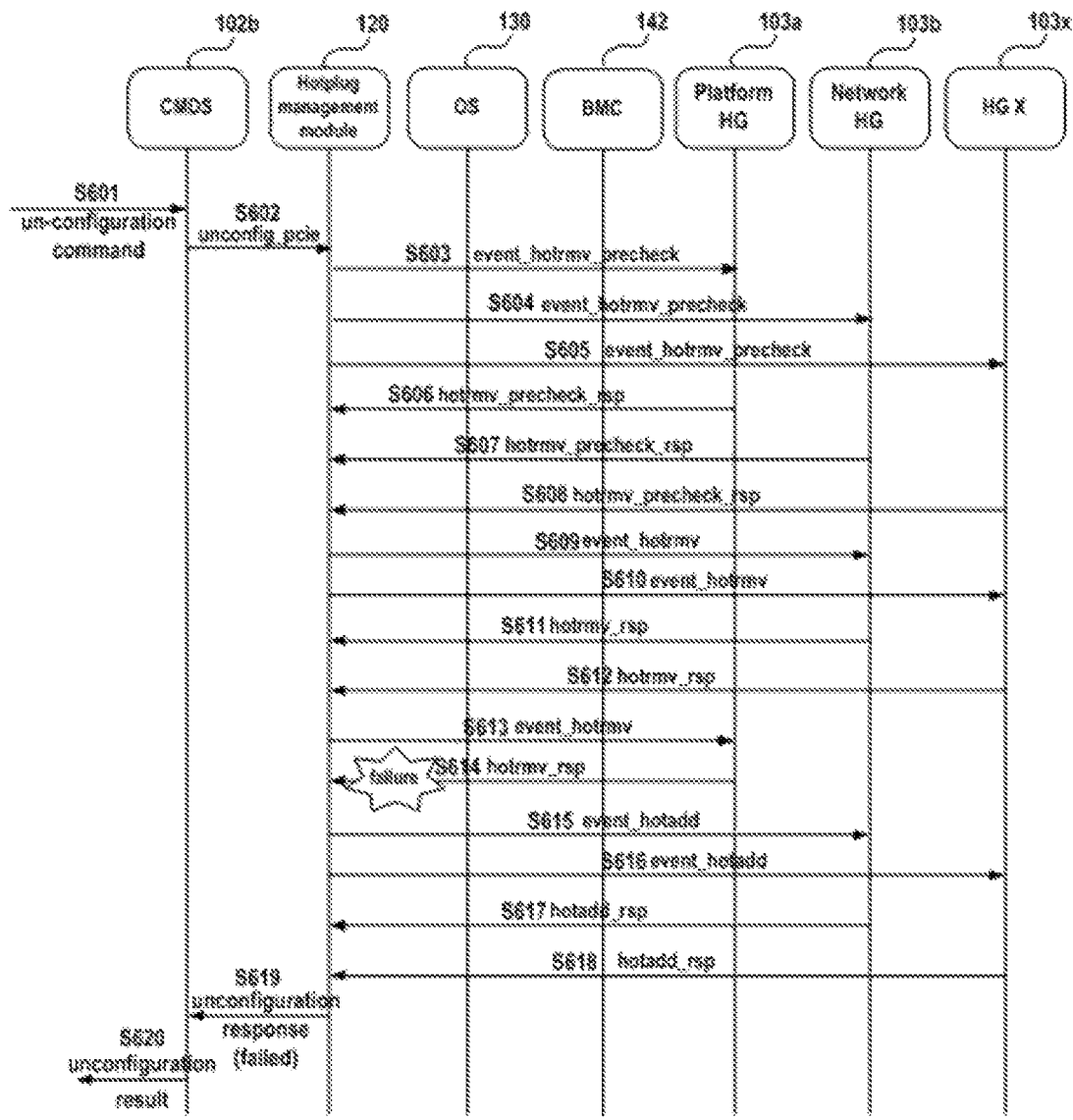
FIG. 6 schematically shows a signal flow diagram of an exemplary hot removal operation in an error circumstance according to one embodiment of the present disclosure.

FIGS. 5 and 6 show flow diagrams of a hot removal process and a failure existing during a hot removal. For the purpose of simplification, operations similar to those in FIG. 4 will not be detailed herein. Instead, their differences are focused. Specifically, compared with the hot adding process, changes of the hot removal process lie in the following two points. The first point lies in that before the invoked HG service module performs a hot removal operation, hotplug management module 120 will first invoke platform hotplug group service module 103a, storage device HG service module 103b, and HG X service module 130x in steps S503-S505 to perform a hot removal pre-check. If any HG service module returns a failure message, then hotplug management module will suspend the operation and returns an error message to the user. The objective of the operation is to reduce the possibility of partial removal failure (i.e., some HGs are successfully removed, while other HGs fail to be removed), which is implemented through a two-stage confirmation as shown in the figure. The second point is that if there is any failure during the un-configuration, hotplug management module 120 will send a configure message to PCI service module 103a, storage device HG service module 103b, and HG X service module 130x in steps S615 to S617 to attempt to roll back to the configured state, with an objective to try to keep the system working normally.

Figure 7:
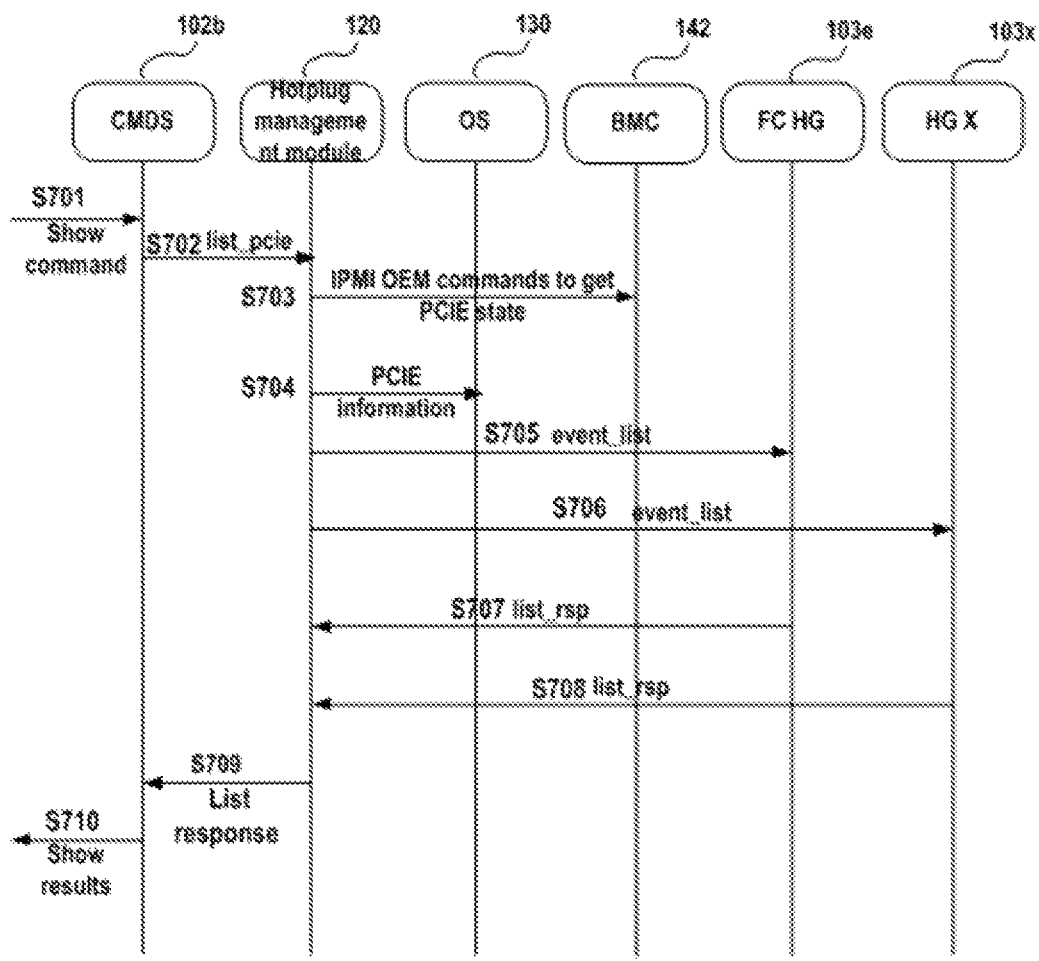
FIG. 7 schematically illustrates a signal flow diagram of an exemplary state presentation operation according to one embodiment of the present disclosure.

FIG. 7 shows a signal flow for showing PCIE device information, wherein it is illustrated a PCIE device of an FC channel type as an example. In FIG. 7, both of the SCSITGT and HG X service modules are interested in the device of an FC card type. Therefore, when a user intends to list a message about FC, it will notify both of them. As shown in FIG. 7, CMDS module 102a receives a show command from a user in step S701; afterwards, CMDS module 102a will send the message command message "list_pice" for showing the information of PCIE device to hotplug management module 120 in step S702. Hotplug management module 120 then invokes the IPMI OEM command "get PCIE" in step S703 to request the BMC to obtain the status of PCIE device, and sends the PCIE information request to the OS. Next, hotplug service module 120 will send the information event event_list to FC HG service module 103e and HG X service module 103x which are interested in the PCIE device type. FC HG service module 103e and HG X service module 103x obtain corresponding information after receiving the event_list and returns the response to hotplug management module 102. Finally, hotplug management module 120 will return a list of results to CMDS module 102b, while CMDS module 102a further returns the show result to the user.

Next, error and failure processing in embodiments according to the present disclosure will be discussed. For the purpose of illustration, examples of failure cases will be provided below.

Failure Case 1:

Failure: a failure in IPMI library (BMC hanging most probably). This will result in the hotplug management module not being able to retrieve the physical state of PCIE device or using such information.

Handling: because the first step of any operation is to obtain information from the BMC, failure of this operation will cause operation aborted, and the user will see a detailed message one the CLI interface.

User action: he/she might need to notify support staff.

Failure Case 2:

Failure: for a hot adding, when the hotplug management module issues a "rescan" command, it fails to receive a Uevent from the kernel within a pre-determined time interval, which indicates a PCIE configuration failure at the kernel level.

Handling: the hotplug management module will initiate a timer and require the kernel to perform rescan. If the timer expires, the hotplug management module will regard it as a fatal error and abort the hot adding operation. Moreover, the detailed message will be displayed on the CLI interface.

User action: the user may re-try this operation. In the case of failure again, he/she needs to notify the support stuff.

Failure Case 3:

Failure: in the case of hot adding, after PCIE device is configured in the kernel, it further needs the HG service module to perform configuration. The HG service module fails to configure PCIIE in the user level (it will return a response to indicate an error), or no response is received from the HG within a predetermined time (or the HG service module process collapses or the IPC channel stops working).

Handle: each request operation for the HG will be guarded by a timer; so a timeout can be detected. In the case of a timeout, the hotplug management module may check the channel state. If the channel has closed, an error returns to the user post an alert. If a plurality of HG service modules have been notified and only a part of HG service modules succeed, then the hotplug management module should regard the configuration operation as a failure and returns detailed error information to the user. This situation may occur in a scenario, wherein for a combined card with a part of as network card functionality and the other part as FC functionality, configuration regarding one of functionalities is completed, while the other cannot work properly. If the hotplug management module receives an error response from the HG service module, the same measures will be employed as the error handling described hereinabove.

User action: the user may re-try the operation. In the case of failure again, he/she needs to notify the support staff.

Failure Case 4:

Failure: in the case of hot removal, when the hotplug management module issues a removal command to perform hot removal, UEVENT is not received from the kernel within a predetermined time interval, which indicates a PCIE layer device removal failure at the kernel level.

Handling: the hotplug management module will initiate a timer before requesting the kernel to perform removal; in the case of timeout, then the hotplug management module will regard it as a fatal error, and attempt to roll back to the un-configuration operation by requesting the HG service module to perform a hot adding operation. After rolling back operations are completed, regardless of success or failure, the hotplug management module will return a failure message for this un-configuration operation and provide detailed information to the user.

User action: the user may retry this operation. In the case of failure again, it needs to notify the support staff.

Failure Case 5:

Failure: in the case of hot removal, the hotplug management module will request the HG service module to perform removal after receiving a positive response from the pre-check of the HG service module. The HG service module may fail to cancel the PCIE configuration at the user level (it will return a response to indicate occurrence of error), or there might be a hotplug management module which does not receive the response from the HG service module within a predetermined time (either the HG management module collapses or the IPC channel stops working).

Handling: each request operation for the HG will be guarded by a timer, and thus a timeout can be detected. If the timeout occurs, the hotplug management module will check the channel state. If the channel has been closed, an error is returned to the user and an alarm is posted. If a plurality of HG service modules is notified to perform operations and only a part of HG service modules succeed, then the hotplug management module attempts to roll back the hot removal operation of other HG service modules by sending a hot adding request. After the rolling back is completed, the hotplug management module returns a failure message regarding the un-configuration operation and returns detailed information to the user. If the hotplug management module receives an error response from the HG service module, the same policy will be adopted as the error handling described hereinabove.

User action: the user may retry the operation. If it does not succeed yet, he/she needs to notify the support staff.

Failure Case 6:

Failure: before the HG service module completes a registration, the user issues a hot adding or removal deletion.

Handling: this situation likely occurs when the hotplug management module is started or the hotplug management module is restarted. In order to handle this situation, the hotplug management module will deliberately wait for a period of time before accepting any CLI request. The length of this period of time may be determined through testing.

User action: the user may retry the operation.

Failure Case 7:

Failure: HG service module crashes and restarts.

Handling: when the HG service module crashes during the operation of show/hot adding/hot removal, the hotplug management module may detect a crash and handles the crash as a response timeout of the HG service module. When the HG service module has crashed before the operation and then the operation request arrives, the hotplug management module will reject the operation request with an error.

When the HG service module restarts, it will register again. In this case, the hotplug management module will check the identification and type of the HG service module so as to update a channel status related to this HG service module. The name plus type of the HG service module may be used for uniquely identifying an HG service module.

User action: the user may retry the operation.

Failure Case 8

Failure: the hotplug management module per se crashes.

Handling: when the hotplug management module crashes, a callback function will be invoked, which is one of the APIs in the hotplug interface library provided by the user during the library initialization period. In this way, re-registering itself may be tried automatically. Therefore, the hotplug management module will be re-started automatically upon crash.

User action: the user may re-try the operation.

Besides, on the PCIE card/slot usually an LED lamp is installed for state indication. These LEDs may be managed as well. For example, during the hotplug operation period, the LEDs of the slot/PCIE device may be opened/closed; meanwhile, the states of these LEDs may be displayed via an interface on a command line interface. During the hotplug operation period, the hotplug management module may also send alarm information for a hardware error. The hardware error, for example, may be a power supply failure error of the slot power-on device, PCI configuration failure, etc. Meanwhile, for abnormalities and hotplug operations, the hotplug management module may perform log recording. For example, when the connection between the HG service module and the hotplug management module cannot work normally or they are reconnected, or when the hotplug operation succeeds or fails, relevant log may be recorded.

According to a further aspect of the present disclosure, there is further provided a method for managing a PCIE device hotplug, which will be described with reference to FIG. 8 hereinafter.

Figure 8:
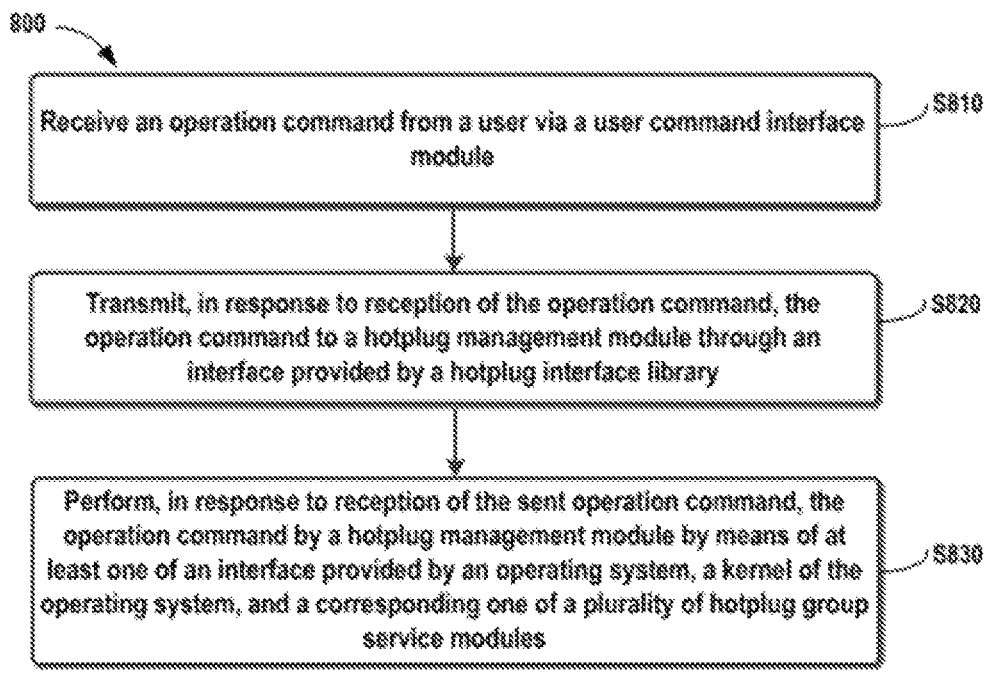
FIG. 8 schematically illustrates a flow diagram of a method for managing PCIE device hotplug according to one embodiment of the present disclosure.

As shown in FIG. 8, first, in step S801, an operation command from a user is received by a user command interface module. Then, in step S802, in response to receipt of the operation command, the operation command is sent to a hotplug management module via an interface provided by a hotplug interface library. The user command input via the user command interface module may be sent to the hotplug management module by invoking a user command service module, a corresponding interface provided by the hotplug interface library. Next, in step S803, in response to the reception of the sent operation command, the operation command is performed by the hotplug management module by means of at least one of an interface provided by the operating system, a kernel of the operating system, and a corresponding one of a plurality of hotplug group service modules.

In one embodiment, the plurality of hotplug group service modules may include hotplug group service modules corresponding to device types and a platform hotplug group service module common to all device types. In a further embodiment, a hotplug group service modules corresponding to the device types may be configured to provide specific hotplug related services to devices of corresponding types, and a platform hotplug group service module may be configured to provide required basic services to devices of all types.

In one embodiment, the method may further include: in response to subscription requests of a plurality of hotplug group service modules, subscribe a device type of interest for them by a hotplug management module. A further embodiment may include invoking a corresponding hotplug group service module by a hotplug management module based on a type of a device which an operation command is directed to, and subscriptions of the plurality of hotplug group service modules.

In a further embodiment, a hotplug interface library may be configured to provide a first set of application interfaces which are configured for interaction between a user command interface module and a hotplug management module.

In a further embodiment, a hotplug interface library may be configured to provide a second set of application interfaces which are configured for interaction between a plurality of hotplug group service modules and a hotplug management module.

In a further embodiment, a hotplug management module may further include a client management module, a channel management module, an event management module and a central control module. In a further embodiment, a hotplug management module may respectively manage interactions with a user command interface modules through a client management module and manage interactions with a plurality of hotplug group service modules through a channel management module. A further embodiment may include listening to PCIE device hotplug-related events from a kernel of the operating system. A further embodiment may include performing corresponding operations by invoking, using a central control module, at least one of an interface provided by an operating system, a kernel of the operating system, and a corresponding plurality of hotplug group service modules, in response to a request from a client management module, a channel management module, or an event management module.

In one embodiment, the operating system may be LINUX, and hotplug management module performs a hotplug related operation on PCIE device via an interface provided by an intelligent platform interface library in the LINUX system, an interface provided by an external component interface library, a kernel invoking interface, and a kernel event.

In a further embodiment, a hotplug management module may be interacted with at least one of a user command interface module and a plurality of hotplug group service modules based on a socket interface.

In a further embodiment, an operation command may include one or more of: a show command, a power-on command, a power-off command, a configuration command, and an un-configuration command.

In a further embodiment, PCIE device hotplug may involve one or more of: empty state, indicating that no card may have been inserted in a slot; unpowered state, indicating that a card may have been inserted into the slot but has not been powered yet; powered state, indicating that a card inserted in the slot may have been powered but has not been configured yet; configured state, indicating that the card in the slot may have been configured; and maintenance state, indicating a failure in a configuration operation or un-configuration operation on a card inserted in the slot, wherein after retrying a configuration operation or un-configuration operation that may succeed, the state may be changed to a configured state or a powered state.

According to a further embodiment the method may be implemented through a computer program product. In a further embodiment, a computer program includes program code thereon, which, when executed on a processor, causes the processor to perform a method described above in accordance with the embodiments of the present disclosure.

Those skilled in the art would appreciate that although embodiments of the present disclosure have been described above with reference to a LINUX operating system, it should be noted that the present disclosure may also be implemented based on other operating systems, e.g., Linux, Windows, iOS etc. Moreover, a PCIE has been described above with reference to a PCIE card. However, in fact, the present disclosure may be applied to any other type of PCIE device. Additionally, it may also be understood that from the disclosure and the teaching provided herein, those skilled in the art may envisage various alternations, transformations, substitutions or equivalents without departing from the spirit and scope of the present disclosure. These modifications, transformations, substitutions or equivalents shall be included within the scope of the present disclosure that is only defined in the claims.

It should be noted that the present disclosure may be implemented in software or a combination of software and hardware; for example, it may be implemented by a dedicated integrated circuit (ASIC), a general-purpose computer, or any other similar hardware device. In an embodiment, the software program of the present disclosure may be executed by a processor so as to implement the above steps or functions. Likewise, a software program of the present disclosure (including relevant data structure) may be stored in a computer readable recording medium, for example, a RAM memory, a magnetic or optical driver, or a floppy disk, and similar devices. Besides, some steps of functions of the present disclosure may be implemented by hardware, for example, a circuit cooperating with the processor to execute various functions or steps.

Further, a portion of the present disclosure may be embodied as a computer program product, for example, a computer program instruction, which, when executed by the computer, may invoke or provide a method and/or technical solution according to the embodiments of the present disclosure disclosed herein through operations of the computer. Further, a program instruction invoking a method of the present disclosure may be stored in a stationary or removable recording medium, and/or transmitted through broadcast or data flow in other signal bearer media, and/or stored in a working memory of a computer device which operates based on the program instruction. Herein, in an embodiment according to the present disclosure, an apparatus comprises a memory for storing a computer program instruction and a processor for executing the program instruction, wherein when a computer program instruction is executed by a processor, an apparatus is triggered to execute the methods and/or technical solutions according to a plurality of embodiments of the present disclosure disclosed above.

To those skilled in the art, it is apparent that the present disclosure is not limited to the details of the above exemplary embodiments, and the present disclosure may be implemented in any other forms without departing from the spirit or basic features of the present disclosure. Thus, in any way, the embodiments should be regarded as exemplary, not limitative; the scope of the present disclosure is limited only by the appended claims, instead of the above depiction. Thus, it is directed to covering all variations falling into the idea and scope of equivalent elements of the claims within the present disclosure. No reference signs in the claims should be regarded as limiting the involved claims. Besides, it is apparent that the term "comprise/comprising/include/including" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

What is claimed is:

1. A system for managing a Peripheral Component Interface Express (PCIE) device hotplug, the system comprising:
    a user command interface module, on a data storage system including one or more processors, configured to provide an interface for a user to input an operation command, wherein the operation command is inputted by the user via the user command interface module and is sent to a hotplug management module by invoking, by a user command service module, a corresponding interface provided by a hotplug interface library;
    the hotplug interface library configured to provide an interface for interacting with the hotplug management module on the data storage system, wherein the hotplug interface library is configured to provide:
        a first set of application programming interfaces that are configured for interaction between the user command interface module and the hotplug management module, and
        a second set of application programming interfaces that are configured for interaction between at least one of a corresponding plurality of hotplug group service modules and the hotplug management module;
    the hotplug management module configured to perform, in response to the operation command from the user, execute the operation command by means of at least one of an interface provided by an operating system, and the at least one of a corresponding plurality of hotplug group service modules, wherein the hotplug management module is enabled to configure and unconfigure a PCIE device in the data storage system, wherein the plurality of hotplug group service modules comprises:
        a hotplug group service module corresponding to only one device type and a platform hotplug group service module that is common to all device types.

2. The system according to claim 1, wherein the platform hotplug group service module is configured to provide basic services to all the device types.

3. The system according to claim 2, wherein the hotplug management module is configured to subscribe, in response to a subscription request from the plurality of hotplug group service modules, a device of interest for the hotplug management module, and to invoke
    a corresponding hotplug group service module based on the device type to which the operation command is directed; and
    subscriptions of the plurality of hotplug group service module.

4. The system according to claim 2, wherein the hotplug management module comprises:
    a client management module configured to manage interaction between the hotplug management module and the user command interface module;
    a channel management module configured to manage interaction between the hotplug management module and the plurality of hotplug group service modules;
    an event management module configured to monitor a PCIE device hotplug-related event from a kernel of the operating system; and
    a central control module configured to perform a correspond operation by invoking, in response to a request from the client management module, the channel management module or the event management module, at least one of an interface provided by the operating system, the kernel of the operating system, and a corresponding hotplug group service module.

5. The system according to claim 2, wherein the hotplug management module performs hotplug related operations to the PCIE device via an interface provided by an intelligent platform management interface library in the Operating system, an interface provided by a peripheral component interface library, a kernel invoking interface, and a kernel event.

6. The system according to claim 2, wherein the hotplug management module interacts with at least one of the user command interface module and the plurality of hotplug group service modules based on a socket interface.

7. The system according to claim 2, wherein the operation command includes one or more consisting from the group of: a show command, a power-on command, a power-off command, a configuration command, and an un-configuration command.

8. The system according to claim 2, the PCIE device hotplug comprises at least one of the following states of:
    a. empty state, indicating no card is inserted in a slot;
    b. unpowered state, indicating a card is inserted into the slot but has not been powered yet;
    c. powered state, indicating the card inserted in the slot has been powered but has not been configured yet;
    d. configured state, indicating that the card in the slot has been configured; and
    e. maintenance state, indicating a failure in a configuration operation or un-configuration operation on the card inserted in the slot, wherein after successfully retrying the configuration operation or un-configuration operation, the state will be changed to the configured state or the powered state.

9. A method for managing a peripheral component interface express (PCIE) device hotplug, comprising:
    receiving, at a data storage system including one or more processors, an operation command from a user through a user command interface module, wherein the operation command is inputted by the user via the user command interface module and is sent to a hotplug management module by invoking, by a user command service module, a corresponding interface provided by a hotplug interface library;
    sending, in response to reception of the operation command, the operation command to the hotplug management module via an interface provided by the hotplug interface library, wherein the hotplug interface library is configured to provide:
        a first set of application programming interfaces that are configured for interaction between the user command interface module and the hotplug management module, and a second set of application programming interfaces that are configured for interaction between at least one of a corresponding plurality of hotplug group service modules and the hotplug management module; and performing, by the hotplug management module, the operation command by means of at least one of an interface provided by an operating system, and the at least one of a corresponding plurality of hotplug group service modules, in response to receiving the operation command, wherein the hotplug management module is enabled to configure and unconfigure a PCIE device in the data storage system, wherein the plurality of hotplug group service modules comprises:

a hotplug group service module corresponding to only one device type and a platform hotplug group service module that is common to all device types.

10. The method according to claim 9, wherein the platform hotplug group service module is configured to provide basic services to all the device types.

11. The method according to claim 10, further comprising, subscribing, in response to a subscription request from the plurality of hotplug group service modules, a device of interest for the hotplug management module, and wherein the hotplug group service module is invoked, by the hotplug management module, based on a device type to which the operation command is directed and subscriptions of the plurality of hotplug group service modules.

12. The method according to claim 10, wherein the hotplug management module further comprises a channel management module, an event management module and a central control module, wherein the hotplug management module respectively manages interactions with the user command interface modules through the client management module, and manage interactions with the plurality of hotplug group service modules through the channel management module;

listens to PCIE device hotplug-related events from a kernel of the operating system through the event management module; and performs a corresponding operation by invoking at least one of the interface provided by the operating system, the kernel of the operating system and the corresponding hotplug group service module through the central control module, in response to a request from the client management module, the channel management module, or the event management module.

13. The method according to claim 10, hotplug management module performs a hotplug related operation on the PCIE device via an interface provided by an intelligent platform interface library in the operating system, an interface provided by an external component interface library, a kernel invoking interface, and a kernel event.

14. A non-transitory computer program product including a program code embodied thereon, which, when executed on a processor, causes the processor to perform the method for managing a peripheral component interface express (PCIE) device hotplug, comprising:

receiving, on a data storage system including one or more processors, an operation command from a user through a user command interface module, wherein the operation command is inputted by the user via the user command interface module and is sent to a hotplug management module by invoking, by a user command service module, a corresponding interface provided by the hotplug interface library;

sending, in response to reception of the operation command, the operation command to the hotplug management module via an interface provided by a hotplug interface library, wherein the hotplug interface library is configured to provide:

a first set of application programming interfaces that are configured for interaction between the user command interface module and the hotplug management module, and a second set of application programming interfaces that are configured for interaction between at least one of a corresponding plurality of hotplug group service modules and the hotplug management module; and performing, by the hotplug management module, the operation command by means of at least one of an interface provided by an operating system, and the at least one of a corresponding plurality of hotplug group service modules, in response to receiving the operation command, wherein the hotplug management module is enabled to configure and unconfigure a PCIE device in the data storage system, wherein the plurality of hotplug group service modules comprises:

a hotplug group service module corresponding to only one device type and a platform hotplug group service module that is common to all device types.

* * * * *